(12) United States Patent
Hofmann et al.

(10) Patent No.: US 12,347,076 B2
(45) Date of Patent: Jul. 1, 2025

(54) JOINT NEURAL DENOISING OF SURFACES AND VOLUMES

(71) Applicant: NVIDIA Corporation, Santa Clara, CA (US)

(72) Inventors: Nikolai Till Hofmann, Nuremberg (DE); Jon Niklas Theodor Hasselgren, Bunkeflostrand (SE); Carl Jacob Munkberg, Malmö (SE)

(73) Assignee: NVIDIA Corporation, Santa Clara, CA (US)

( * ) Notice: Subject to any disclaimer, the term of this patent is extended or adjusted under 35 U.S.C. 154(b) by 377 days.

(21) Appl. No.: 18/178,817

(22) Filed: Mar. 6, 2023

(65) Prior Publication Data

US 2024/0112308 A1    Apr. 4, 2024

Related U.S. Application Data

(60) Provisional application No. 63/430,418, filed on Dec. 6, 2022, provisional application No. 63/411,692, filed on Sep. 30, 2022.

(51) Int. Cl.
*G06T 5/70* (2024.01)
*G06T 5/20* (2006.01)
*G06T 15/06* (2011.01)

(52) U.S. Cl.
CPC ............ *G06T 5/70* (2024.01); *G06T 5/20* (2013.01); *G06T 15/06* (2013.01); *G06T 2207/20084* (2013.01)

(58) Field of Classification Search
None
See application file for complete search history.

(56) References Cited

U.S. PATENT DOCUMENTS

2009/0208409 A1\* 8/2009 Summers ............... A61P 43/00
                                                        424/9.34
2010/0246691 A1\* 9/2010 Filippini ............. H04N 19/176
                                                        375/E7.076

(Continued)

OTHER PUBLICATIONS

Burley, B., "Physically Based Shading at Disney," in SIGGRAPH Courses: Practical Physically Based Shading in Film and Game Production (2012).

(Continued)

*Primary Examiner* — David H Chu
(74) *Attorney, Agent, or Firm* — Leydig, Voit & Mayer, Ltd.

(57) ABSTRACT

Denoising images rendered using Monte Carlo sampled ray tracing is an important technique for improving the image quality when low sample counts are used. Ray traced scenes that include volumes in addition to surface geometry are more complex, and noisy when low sample counts are used to render in real-time. Joint neural denoising of surfaces and volumes enables combined volume and surface denoising in real time from low sample count renderings. At least one rendered image is decomposed into volume and surface layers, leveraging spatio-temporal neural denoisers for both the surface and volume components. The individual denoised surface and volume components are composited using learned weights and denoised transmittance. A surface and volume denoiser architecture outperforms current denoisers in scenes containing both surfaces and volumes, and produces temporally stable results at interactive rates.

26 Claims, 15 Drawing Sheets

(56) References Cited

U.S. PATENT DOCUMENTS

| | | | | |
|---|---|---|---|---|
| 2011/0107270 | A1* | 5/2011 | Wang | G16H 20/40 |
| | | | | 703/11 |
| 2013/0127895 | A1* | 5/2013 | Miller | G06T 15/503 |
| | | | | 345/589 |
| 2019/0139275 | A1* | 5/2019 | Hao | A61B 6/5288 |
| 2024/0320787 | A1* | 9/2024 | Shen | G06T 5/70 |

OTHER PUBLICATIONS

Bako, S., et al., "Kernel-Predicting Convolutional Networks for Denoising Monte Carlo Renderings," ACM Trans. Graph. 36, 4 (2017).

Paszke, A., et al., "Automatic differentiation in PyTorch," In NIPS-W, 2017.

Perlin, K., et al., "Hypertexture," In Proceedings of the 16th Annual Conference on Computer Graphics and Interactive Techniques (Jul. 1989), vol. 23, pp. 253-262.

Ronneberger, O., et al., "U-Net: Convolutional Networks for Biomedical Image Segmentation," In Medical Image Computing and Computer-Assisted Segmentation, MICCAI 2015, vol. 9351, pp. 234-241.

Anderson, M., et al., "Proposal for aA Standard Default Color Space for the Internet—sRGB", Nov. 1996.

Schied C., et al., "Spatiotemporal Variance-Guided Filtering: Real-Time Reconstruction for Path-Traced Global Illumination," In Proceedings of High Performance Graphics (2017), HPG, pp. 2:1-2:12.

Vogels, T., et al., "Denoising with Kernel Prediction and Asymmetric Loss Functions," ACM Trans. Graph. 37, 4 (2018), 124:1-124:15.

Zwicker, M., et al., "Recent Advances in Adaptive Sampling and Reconstruction for Monte Carlo Rendering," Computer Graphics Forum (Proceedings of Eurographics—State of the Art Reports), 34, 2 (2015), 667-681.

Christensen, P., et al., "Renderman: An advanced path-tracing architecture for movie rendering," ACM Transactions on Graphics (TOG) 37, 3 (2018), 2-21.

Chaitanya, C., et al., "Interactive Reconstruction of Monte Carlo Image Sequences Using a Recurrent Denoising Autoencoder," ACM Trans. Graph. 36, 4 (Jul. 2017).

Chimpoi, M., et al., "Describing Textures in the Wild," In Proceedings of the IEEE Conf. on Computer Vision and Pattern Recognition (CVPR) (2014).

Glorot, X., et al., "Understanding the difficulting of training deep feedforward neural networks," In Proceedings of the Thirteenth International Conference on Artificial Intelligence and Statistics (2010), vol. 9 of the Proceedings of Machine Learning Research, pp. 249-256.

Gharbi, M., et al., "Sample-based Monte Carlo Denoising Using a Kernel-Splatting Network," ACM Trans. Graph. 38, 4 (Jul. 2019), 125:1-125:12.

Hofmann, N., et al., "Interactive path tracing and reconstruction of sparse volumes," Proc. ACM Comput. Graph. Interact. Tech. 4, 1 (2021).

Hofmann, N., et al., "Neural denoising for path tracing of medical volumetric data," Proc. ACM Comput. Graph. Interact. Tech. 3, 2 (2020).

Hasselgren, J., et al., "Neural Temporal Adaptive Sampling and Denoising," Computer Graphics Forum 39 (2020), 147-155.

Kingma, D., et al., "Adam: A Method for Stochastic Optimization," In Proceedings of the 3rd International Conference for Learning Representations (2015).

Munkberg, J., et al., "Neural Denoising with Layer Embeddings," Computer Graphics Forum 39, 4 (2020), 1-12.

Andersson, P., et al., "Flip: A Difference Evaluator for Alternating Images," Proceedings of the ACM on Computer Graphics and Interactive Techniques 3, 2020, 15:1-15:23.

Chang, A., et al., "ShapeNet: An Information-Rich 3D Model Repository," Technical Report arXiv:1512.03012.

Comaniciu, D., et al., "Shaping the future through innovations: From medical imaging to precision medicine," pp. 19-26.

Dappa, E., et al., "Cinematic rendering—an alternative to volume rendering for 3D computed tomography imaging," Insights into imaging 7, 6 (2016), 849-856.

Galtier, M., et al., "Integral formulation of null-collision Monte Carlo algorithms," Journal of Quantitative Spectroscopy and Radiative Transfer 125 (2013), 57-68.

Glemser, P., et al., "A new approach for photorealistic visualization of rendered computed tomography images," World neurosurgery 114 (2018), e283-e292.

Henyey, L., et al., "Diffuse radiation in the galaxy," The Astrophysical Journal 93 (1941), 70-83.

Hofmann, N., et al., "Efficient Unbiased Volume Path Tracing on the GPU," In Ray Tracing Gems II, Springer, 699-711.

Iglesias-Guitian, J., et al., "Real-time denoising of volumetric path tracing for direct vol. rendering," IEEE Transactions on Visualization and Computer Graphics (2020).

Karis, B., "High quality temporal anti-aliasing," Advances in Real-Time Rendering for Games, SIGGRAPH Courses (2014).

Kettunen, M., et al., "An unbiased ray-marching transmittance estimator," arXiv preprint arXiv:2102.10294 (2021).

Martschinke, J., et al., "Adaptive temporal sampling for volumetric path tracing of medical data," In Computer Graphics Forum, vol. 38, Wiley Online Library, 67-76.

Meng, X., et al., "Real-Time Monte Carlo Denoising with the Neural Bilateral Grid," In Eurographics Symposium on Rendering.

Museth, K., et al., "VDB: High-resolution sparse vols. with dynamic topology," ACM transactions on graphics (TOG) 32, 3 (2013), 1-22.

Novak, J., et al., "Monte Carlo Methods for Volumetric Light Transport Simulation," Computer Graphics Forum (Proceedings for Eurographics—State of the Art Reports) 37, 2 (May 2018).

Novak, J., et al., "Residual ratio tracking for estimating attenuation in participating media," ACM Trans. Graph. 33, 6 (2014).

Veach, E., et al., "Optimally Combining Sampling Techniques for Monte Carlo Rendering," In Proceedings of the 22nd Annual Conference on Computer Graphics and Interactive Techniques, vol. 29, 419-428.

Wilkie, A., et al., "Hero wavelength spectral sampling," In Computer Graphics Forum, vol. 33, Wiley Online Library, 123-131.

Woodcock, E., et al., "Techniques used in the GEM code for Monte Carlo neutronics calculations in reactors and other systems of complex geometry," In Proc. Conf. Applications of Computing Methods to Reactor Problems, vol. 557.

Xu, B., et al., "Adversarial Monte Carlo Denoising with Conditioned Auxiliary Feature Modulation," ACM Trans. Graph. 38, 6 (2019), 224:1-224:12.

* cited by examiner

Input Image
101

Reference Image
105

Input Image Detail
111

Reference Image Detail
106

Denoised Image
102

Denoised Image
103

Denoised Image
104

Denoised Image Detail
114

Denoised Image Detail
112

Denoised Image Detail
113

Surface Data
201

Transmittance Data
202

Volume Data
205

1 - Transmittance Data
203

Denoised Image
204

Diffuse Illumination
206

$k_d$
207

Specular Illumination
208

$k_s$
209

Emission
211

Surface Data
201

Image
305

Image with Edited Volume Density
310

Image
315

Image with Edited Volumetric Lighting
320

JOINT NEURAL DENOISING OF SURFACES AND VOLUMES

CLAIM OF PRIORITY

This application claims the benefit of U.S. Provisional Application No. 63/411,692 titled "Joint Denoising of Surfaces and Volumes," filed Sep. 30, 2022 and U.S. Provisional Application No. 63/430,418 titled "Joint Neural Denoising of Surfaces and Volumes," filed Dec. 6, 2022, the entire contents of both are incorporated herein by reference.

BACKGROUND

Denoising images rendered using Monte Carlo sampled ray tracing is an important technique for improving the image quality when low sample counts are used to render the image in real-time. Ray traced scenes that include volumes in addition to surface geometry are more complex, and are typically more noisy when low sample counts are used. In contrast with surface geometry, which is typically opaque (e.g., objects such as buildings, roads, characters, etc.), volumes vary in opacity and have "soft" edges (e.g., fog, smoke, etc.). Rendering scenes with surfaces and volumes using conventional techniques and low sample counts typically compromises the image quality of the surfaces and/or the volumes. Volumes present challenges even for offline rendering. There is a need for addressing these issues and/or other issues associated with the prior art.

SUMMARY

Embodiments of the present disclosure relate to joint neural denoising of surfaces and volumes. Systems and methods are disclosed that separately denoise surface and volume data and combine the denoised surface and volume components according to transmittance data for improved image quality. The transmittance data indicates an amount of contribution to a pixel from a volume compared with a surface. Denoising Monte Carlo rendered images sampled using low sample counts for scenes containing both surface geometry and volumes is a challenging task. Most conventional denoisers rely on G-buffer feature guides, e.g., surface normal vectors and textured albedo, to craft edge-stopping filters. However, in the presence of volumes, the features are harder to define, e.g., a surface edge can be partly occluded by a semi-transparent volume. Naively applying feature-based surface denoisers does not typically produce adequate results. Denoisers designed for surface geometry rely on noise-free feature guides for high quality results. However, feature guides are not readily available for volumes.

In contrast with conventional techniques, such as those described above, joint neural denoising of surfaces and volumes enables combined volume and surface denoising in real time from low sample count (e.g., 4 samples per pixel) renderings. In an embodiment, at least one rendered image is decomposed into volume and surface components and spatio-temporal neural denoisers are leveraged for both the surface and volume components. The individual denoised surface and volume components are composited using learned weights and denoised transmittance. A surface and volume denoiser architecture may outperform current denoisers in scenes containing both surfaces and volumes, and produces temporally stable results at interactive rates.

In an embodiment, the method includes processing surface data associated with a first rendered image to produce a surface filter and processing volume data associated with a second rendered image to produce a volume filter. The surface filter is applied to the surface data to generate denoised surface data the volume filter is applied to the volume data to generate denoised volume data. The denoised surface data and the denoised volume data are combined to generate a denoised image including a reduced number of artifacts compared with at least one of the first rendered image and the second rendered image.

BRIEF DESCRIPTION OF THE DRAWINGS

The present systems and methods for joint neural denoising of surfaces and volumes are described in detail below with reference to the attached drawing figures, wherein.

DETAILED DESCRIPTION

Systems and methods are disclosed related to joint neural denoising of surfaces and volumes. Denoising Monte Carlo renderings from low sample counts in scenes containing both surface geometry and volumes is a challenging task. Most conventional denoisers rely on G-buffer feature guides, e.g., surface normal vectors and textured albedo, to craft edge-stopping filters. However, in the presence of volumes, the features are harder to define, e.g., a surface edge can be partly occluded by a semi-transparent volume. Naively applying feature-based surface denoisers may not produce adequate results. Denoisers designed for surface geometry rely on noise-free feature guides for high quality results. However, such noise-free feature guides are not readily available for volumes.

In contrast with conventional techniques, joint neural denoising of surfaces and volumes enables combined volume and surface denoising in real time from low sample count (e.g., 4 samples per pixel) renderings. At least one rendered image is decomposed into volume and surface components, spatio-temporal neural denoisers may be leveraged for both the surface and volume components. The individual denoised surface and volume components are composited using learned weights and denoised transmittance. The denoised transmittance indicates an amount of contribution to a pixel from a volume compared with a surface. A surface and volume denoiser architecture typically outperforms current denoisers in scenes containing both surfaces and volumes, and produces temporally stable results at interactive rates.

In modern computer graphics, images are rendered by sampling the scene using Monte Carlo (MC) ray tracing followed by reconstruction filters. At low sample counts, MC ray tracing comes with significant variance, particularly in scenes with complex light transport, which makes the reconstruction task challenging. Denoisers can reduce the variance by leveraging large spatio-temporal reconstruction filters and detail-preserving feature guides. Recently, there has been significant advances in denoising research, and denoisers are now commonly applied in offline rendering and real-time rendering applications. However, the denoising techniques often struggle on heterogeneous volumetric data, such as clouds and smoke. The feature guides typically used by denoisers, e.g., surface normal vectors and textured albedo, are not applicable for volumes. Furthermore, temporal reuse with reprojection relies on (surface) motion vectors, which are not well-defined for most volumetric data. To overcome these issues, some denoisers target volumes explicitly, but scenes combining volumes and surface geometry remain a challenging task.

Figure 1A:
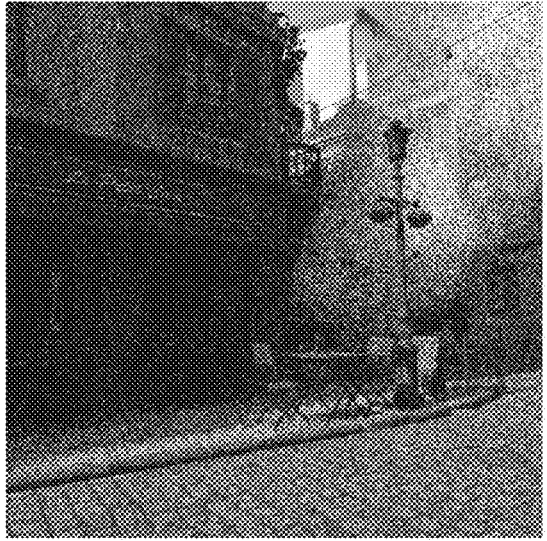
FIG. 1A illustrates noisy input images and reference images in accordance with an embodiment.
Figure 1A:
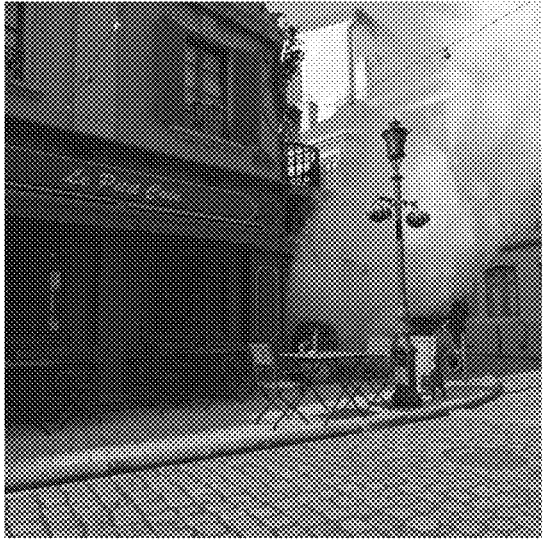
Figure 1A:
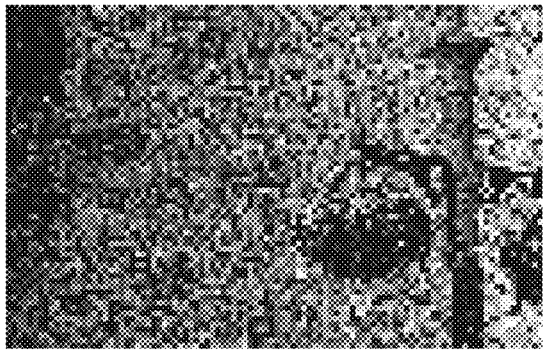
Figure 1A:
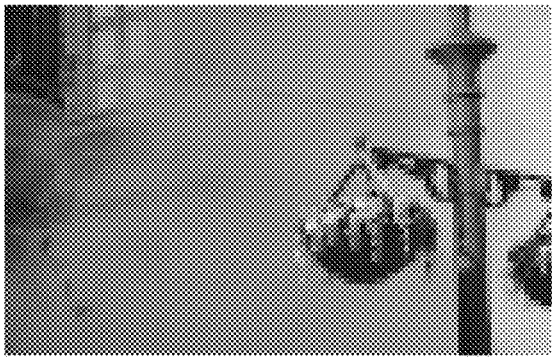

FIG. 1A illustrates a noisy input image 101 and a reference image 105, in accordance with an embodiment. A noisy input image 101 is denoised using three different techniques. A scene that is rendered to produce the reference image 105 includes surface geometry and a semi-transparent volume near the streetlight. A first image pair illustrates the reference image 105 and the noisy input image 101 that is rendered using four samples per pixel (4 spp). A detailed region of the streetlight from the noisy input image 101 is shown in the noisy input image detail 111. The detailed region of the streetlight from the reference image 105 is shown in the reference image detail 106.

Figure 1B:
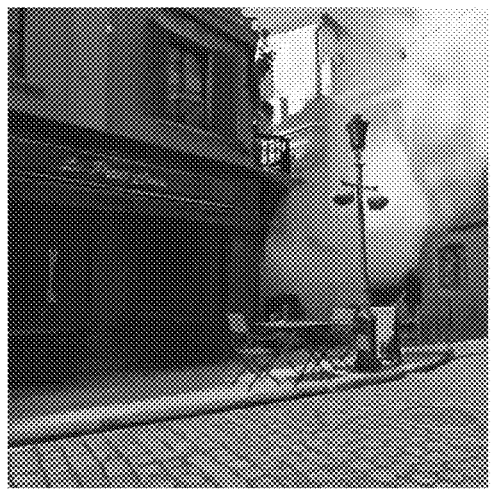
FIG. 1B illustrates denoised images in accordance with an embodiment.
Figure 1B:
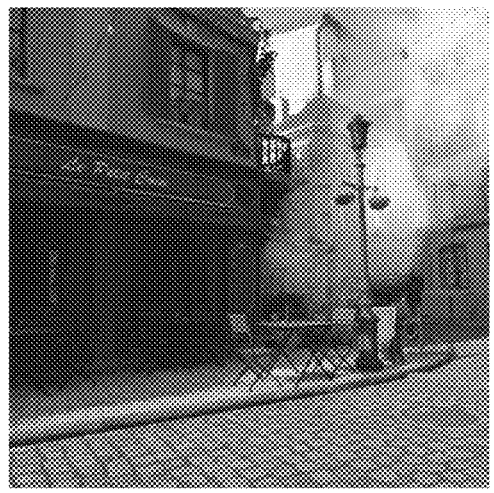
Figure 1B:
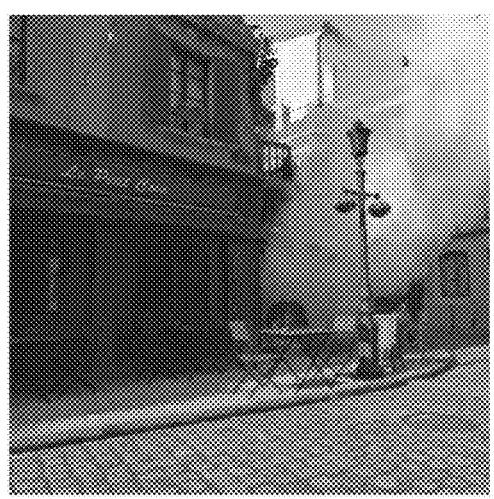
Figure 1B:
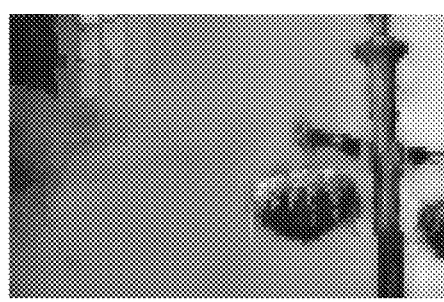
Figure 1B:
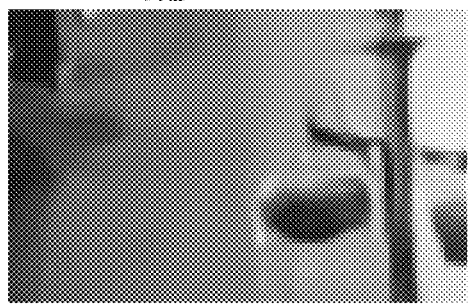
Figure 1B:

FIG. 1B illustrates denoised images 102, 103, and 104, in accordance with an embodiment. The denoised images 102 and 103 are denoised using an image denoiser developed for scenes that include surfaces, so the surface and volume components are not separated for processing. The denoised image 102 is produced using a neural surface denoiser, without surface guides. Compared with the reference image 105 and the reference image detail 106, foreground surfaces (streetlight) and background surfaces viewed through the semi-transparent volume (buildings) are overly blurred in the denoised image 102 and the denoised image detail 112. The denoised image 103 (and denoised image detail 113) is produced using surface guide data (surface normal vectors, texture, albedo) to better identify surface edges, and the edges of the background surfaces are overly sharp and visible through the semi-transparent volume. In contrast, joint denoising of surfaces and volumes robustly handles the appearance of surfaces obscured by the semi-transparent volume.

The denoised image 104 and denoised image detail 114 are produced by separating the volume and surface data for denoising using separate filters. In an embodiment, the volume and surface data are separately denoised using temporal denoisers with kernel predicting neural networks. The denoised volume and surface data are then composited using volume transmittance data. Separately denoising the surface and volume data produces the denoised image 104 that more closely resembles the reference image 105.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1C:
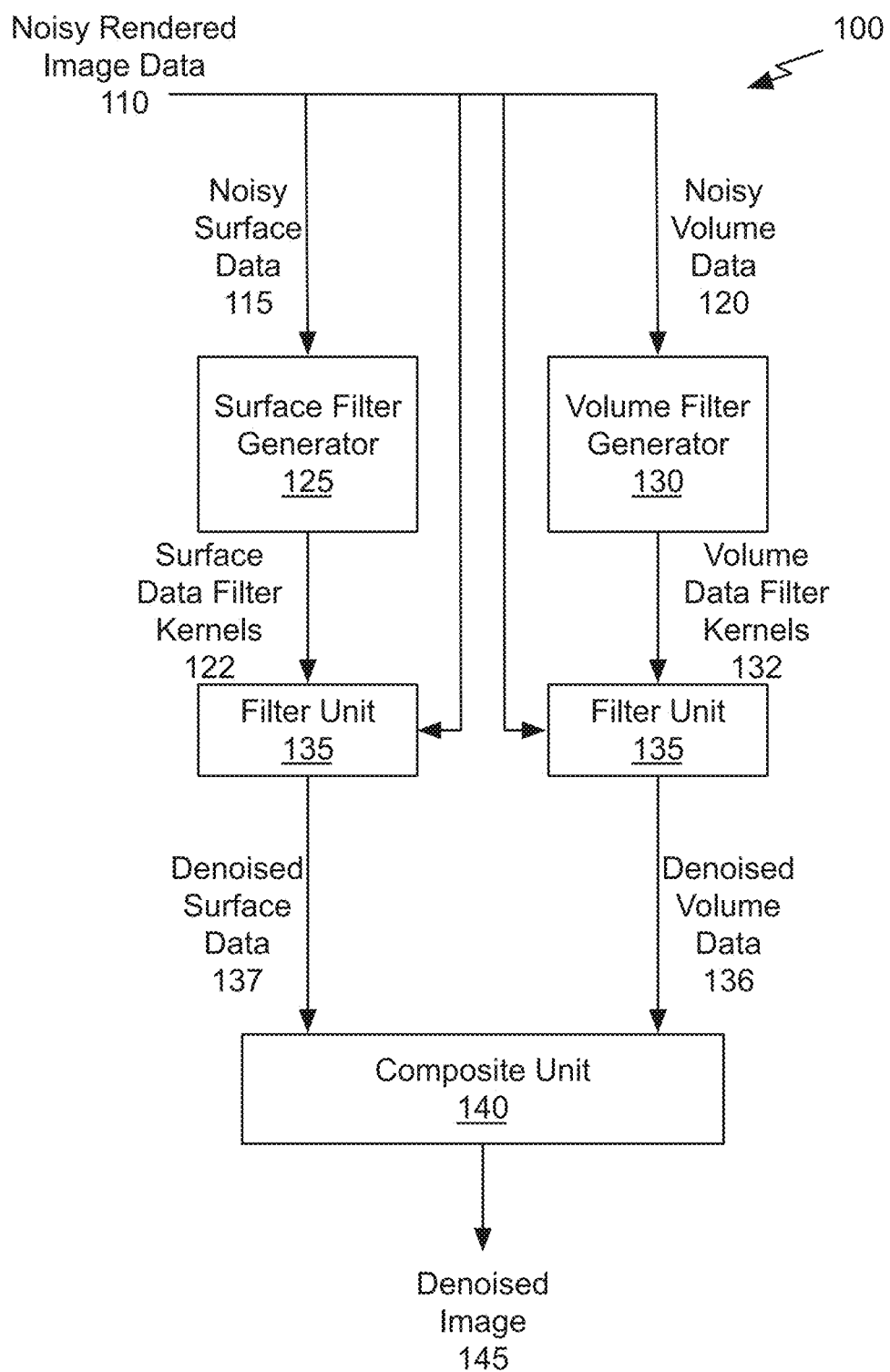
FIG. 1C illustrates a block diagram of an example joint neural denoising system suitable for use in implementing some embodiments of the present disclosure.

FIG. 1C illustrates a block diagram of an example joint neural denoising system 100 suitable for use in implementing some embodiments of the present disclosure. The joint neural denoising system 100 includes a surface filter generator 125, a volume filter generator 130, filter units 135, and a composite unit 140. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the joint neural denoising system 100 is within the scope and spirit of embodiments of the present disclosure.

Noisy rendered image data 110 comprises per-pixel colors, component data, and (feature) guide data generated during rendering. In an embodiment, the noisy rendered image data 110 comprises a surface color buffer and a volume color buffer. In an embodiment, results for multiple samples are combined to compute per-pixel noisy rendered image data 110. The component data provides information needed to distinguish between surface and volume data and may be used to generate the surface color and the volume color buffers. Specifically, for each sample, the component data indicates whether the ray hit a surface or a volume. In an embodiment, when a non-opaque volume is hit during rendering, the ray is extended to hit a surface (if any) behind the volume and the surface data is obtained. The noisy rendered image data 110 comprises noisy surface data 115, such as surface color buffer(s) and guide data buffer(s), and noisy volume data 120, such as a volume color buffer and transmittance buffer. In an embodiment, the noisy rendered image data 110 also comprises an emission buffer.

In an embodiment, during rendering, surface and volume samples are accumulated into separate component buffers based on the component data. Specifically, when the component data indicates that the ray hit a surface, a surface sample is accumulated into the surface buffer and when a volume is hit, a volume sample is accumulated into the volume buffer. In an embodiment, 4-16 samples are rendered for each pixel. In an embodiment, the surface samples are separately accumulated into a diffuse surface buffer and a specular surface buffer. In an embodiment, the samples that are accumulated in each component buffer are averaged for each pixel. In an embodiment, samples are also accumulated into a transmittance buffer to produce per-pixel probability values indicating contributions of the surface and the volume. In an embodiment, transmittance values are averaged for all the paths traced in a pixel. For surface paths, transmittance is 1.0, and for volume paths, transmittance is a value in [0,1] depending on properties of the volume. In an embodiment, properties of the volume comprise semi-transparency related to atmospheric effects (e.g., fog, smoke, etc.) and emissive lighting related to self-luminous effects (e.g., fire, explosion, glowing, etc.).

The guide data associated with the surface data comprises normal vectors (surface normal at the primary hit point seen through each pixel), texture, and the like. Because the volume data is not clearly defined, in an embodiment, no guide data associated with the volume data is available. In an embodiment, guide data associated with the surface data includes one or more of a depth value for each pixel, material parameters, random numbers that were used for sampling etc. In an embodiment, a previously denoised image in a sequence of images (i.e., video) provides temporal information that is included in the guide data for both surfaces and volumes. The noisy surface data 115 comprises the noisy rendered image data 110 and guide data. The noisy volume data 120 comprises the noisy rendered image data 110 and transmittance data.

The noisy surface data 115 and noisy volume data 120 are processed by the surface filter generator 125 and the volume filter generator 130, respectively, to predict separate surface data filter kernels 122 and volume data filter kernels 132 (spatially-varying filter kernels). In an embodiment, the surface filter generator 125 and the volume filter generator 130 are combined and the resulting filter generator predicts the separate surface data filter kernels 122 and volume data filter kernels 132. In an embodiment the surface filter generator 125 and the volume filter generator 130 are implemented as neural network(s) and parameters are learned through joint end-to-end training via image space losses.

In an embodiment, the surface filter generator 125 and the volume filter generator 130 are each implemented using a hierarchical kernel predicting U-Net. In an embodiment, the kernel predicting U-net comprises a cascade of convolutional layers and skip connections. Rather than directly predicting denoised colors, the surface filter generator 125 and the volume filter generator 130 predict a hierarchy of per-pixel filter kernel weights, the separate surface data filter kernels 122 and volume data filter kernels 132. Kernel prediction may be more robust regarding, e.g., color shifts, which stems from implicit regularization due to predicting normalized filter kernels instead. In an embodiment, inputs to the surface filter generator 125 and the volume filter generator 130 are in tone-mapped low-dynamic range (LDR) space, which has better numerical properties for robust feature detection than high-dynamic range (HDR). The predicted surface data filter kernels 122 and volume data filter kernels 132, however, are applied to the unmodified HDR noisy rendered image data 110 directly. As tone map operator, linear radiance values, x, are transformed according to $x'=\Gamma(\log(x+1))$, where $\Gamma(x)$ is the sRGB transfer function.

The surface data filter kernels 122 are applied to the noisy surface data 115 to compute denoised surface data 137. In an embodiment, the noisy surface data 115 comprises noisy specular and diffuse illumination data and two filter kernels are predicted that are applied to the noisy specular and diffuse illumination data, respectively, to compute denoised specular and diffuse illumination data comprising the denoised surface data 137. The volume data filter kernels 132 are applied to the noisy volume data 120 to compute denoised volume data 136. In an embodiment, the noisy volume data 120 comprises noisy color and transmittance data and two filter kernels are predicted that are applied to the noisy color and transmittance data, respectively to compute denoised color and denoised transmittance data comprising the denoised volume data 136.

The composite unit 140 combines the denoised surface data 137 and the denoised volume data 136 to produce a denoised image 145. The denoised transmittance is used by the composite unit 140 to combine the denoised surface data 137 and the color data of the denoised volume data 136, according to learned parameters to produce a denoised image 145. Because ray collisions with the volume are sampled according to transmittance, and a sample either contributes to the surface or volume component, based on the outcome of the stochastic sampling, the overall energy is distributed between the surface and volume processing pipelines with a probability density function equal to primary transmittance. Thus, the surface component is divided by transmittance and the volume component is divided by 1-transmittance to normalize and conserve energy. The normalization further amplifies the importance of a noise-free transmittance component, so the transmittance guide may be denoised with a predicted filter kernel.

Figure 1D:
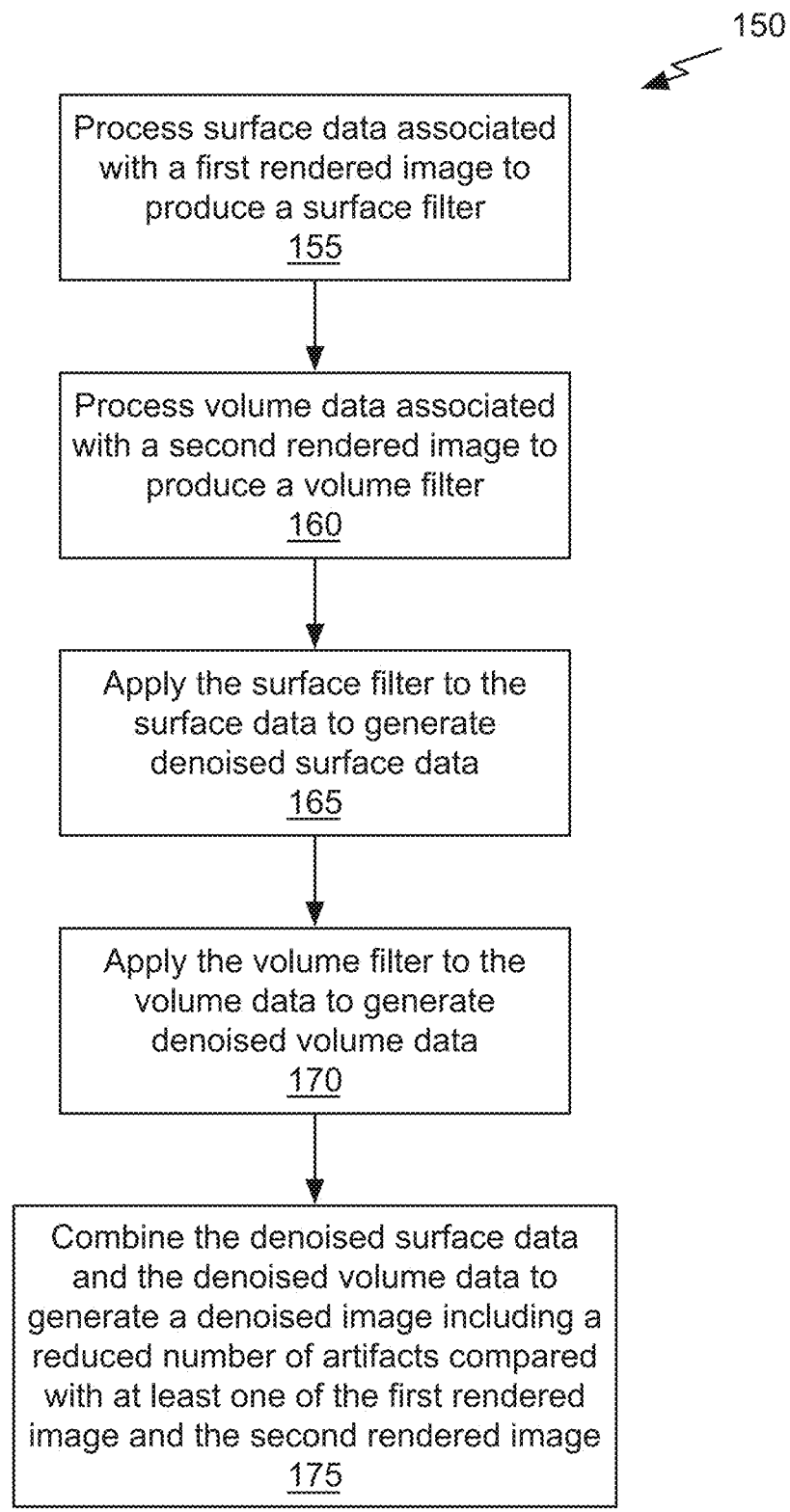
FIG. 1D illustrates a flowchart of a method for joint neural denoising of surfaces and volumes, in accordance with an embodiment.

FIG. 1D illustrates a flowchart of a method for joint neural denoising of surfaces and volumes, in accordance with an embodiment. Each block of method 150, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 150 is described, by way of example, with respect to the joint neural denoising system 100 of FIG. 1C. However, this method may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

At step 155, surface data associated with a first rendered image are processed to produce a surface filter. In an embodiment, the surface data is processed by the surface filter generator 125 to produce the surface data filter kernels 122. In an embodiment, during rendering, the surface data is computed by extending a primary ray for each hit point that intersects a volume. In an embodiment, the surface data for each rendered pixel comprises diffuse color, specular color, a normal vector, and a motion vector.

At step 160, volume data associated with a second rendered image are processed to produce a volume filter. In an embodiment, the volume data is processed by the volume filter generator 130 to produce the volume data filter kernels 132. In an embodiment, the surface data and the volume data are processed using a single neural network model to produce the surface filter and the volume filter. In an embodiment, the surface data is processed using a first neural network model to produce the surface filter and the volume data is processed using a second neural network model to produce the volume filter. In an embodiment, a property of the volume data comprises at least one of semi-transparency and emissive lighting. In an embodiment, parameters used to process the surface data and the volume data are adjusted based on differences between a target image and at least one of the first and second rendered images. In an embodiment, the target image is a ground truth denoised image and the parameters are learned weights that are adjusted during end-to-end training of the joint neural denoising system 100. Steps 155 and 160 may be performed in parallel.

In an embodiment, the first and second rendered image are included in a set of rendered images. In an embodiment, the first and second rendered images are produced by rendering the same scene using the same camera setup. In an embodiment, the first rendered image is produced using ray-tracing and the second rendered image is produced using ray-marching.

At step 165, the surface filter is applied to the surface data to generate denoised surface data. In an embodiment, the surface filter comprises the surface data filter kernels 122 that are applied to the surface data by the filter unit 135 to generate the denoised surface data 137. At step 170, the volume filter is applied to the volume data to generate denoised volume data. In an embodiment, the volume filter comprises the volume data filter kernels 132 that are applied to the volume data by the filter unit 135 to generate the denoised volume data 136. In an embodiment, the denoised volume data comprises denoised transmittance data and denoised color data. Steps 165 and 170 may be performed in parallel.

At step 175, the denoised surface data and the denoised volume data are combined to generate a denoised image including a reduced number of artifacts compared with at least one of the first and second rendered images. In an embodiment, the denoised surface data 137 and the denoised volume data 136 are combined by the composite unit 140 to generate the denoised image 145. In an embodiment, the combining comprises blending the denoised surface data and the denoised color data according to the denoised transmittance data. In an embodiment, additional parameters used to combine the denoised surface data and the denoised volume data are adjusted based on the differences between the target image and at least one of the first and second rendered image. In an embodiment, the additional parameters are additional learned weights that are adjusted during end-to-end training of the joint neural denoising system 100.

Figure 2A:
FIG. 2A illustrates surface and volume components of denoising process for an image suitable for use in implementing some embodiments of the present disclosure.
Figure 2A:
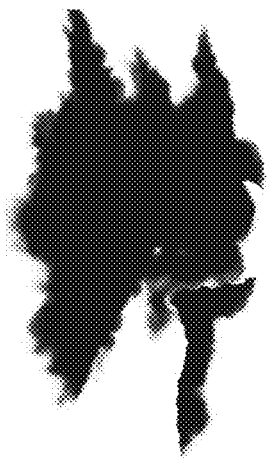
Figure 2A:
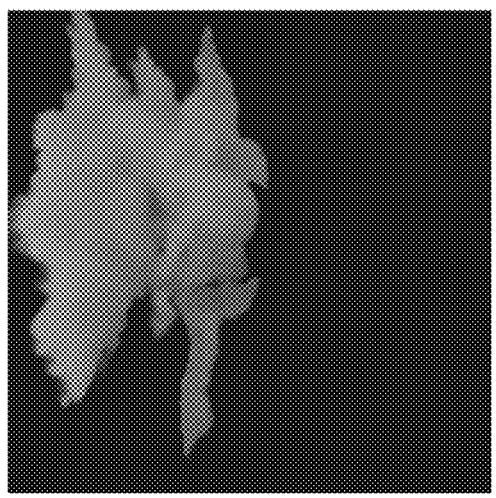
Figure 2A:
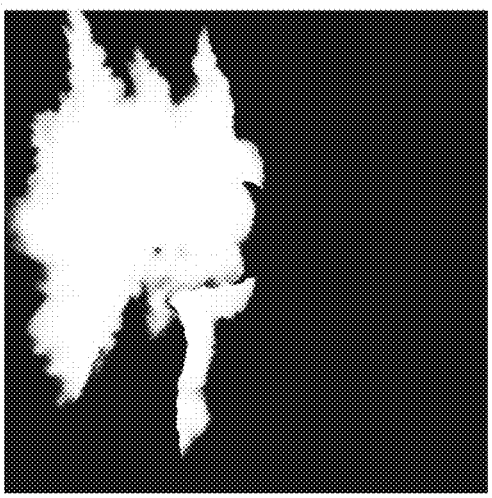
Figure 2A:

FIG. 2A illustrates surface and volume components of a denoising process for an image suitable for use in implementing some embodiments of the present disclosure. The noisy rendered input data 110 is split into a surface component and a volume component that are each filtered to produce the denoised surface data 137 and the denoised volume data 136, respectively. For an example, the denoised (filtered) surface component comprises surface data 201 and the denoised (filtered) volume component comprises volume data 205. The denoised surface component and denoised volume component are then combined based on the denoised (filtered) transmittance. Example denoised transmittance is shown as transmittance data 202 and an negated version of the transmittance (1-transmittance) is shown as 1-transmittance data 203. In an embodiment, the transmittance is obtained during rendering by using a ray-marching technique to retain volume boundaries and limit ghosting. A denoised image 204 is computed as a sum of a first product and a second product, where the first product is a product of the surface data 201 and the transmittance data 202 and the second product is a product of the volume data 205 and the 1-transmittance data 203.

Figure 2B:
FIG. 2B illustrates components of the surface data shown in FIG. 2A suitable for use in implementing some embodiments of the present disclosure.
Figure 2B:
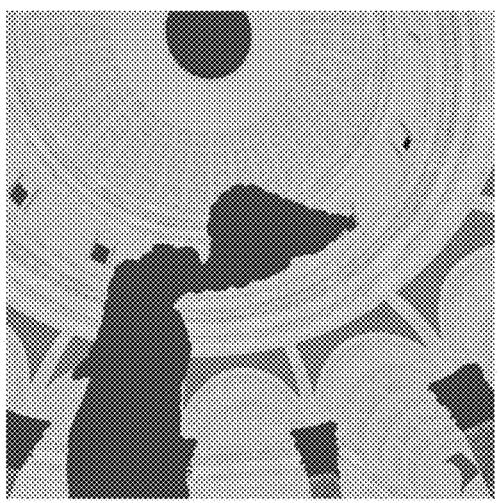
Figure 2B:
Figure 2B:
Figure 2B:
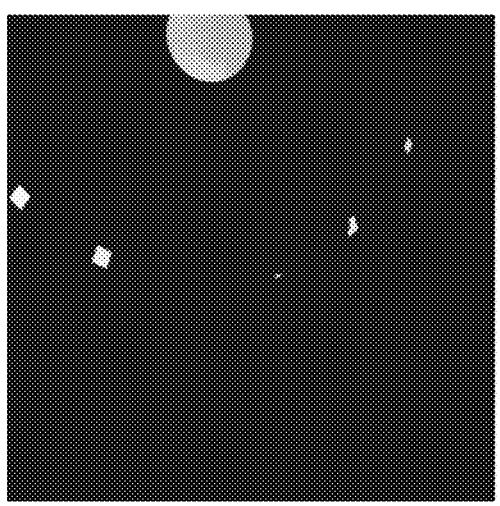
Figure 2B:

FIG. 2B illustrates components of the surface data 201 shown in FIG. 2A suitable for use in implementing some embodiments of the present disclosure. In an embodiment, the surface component is separated into diffuse, specular, emission, and albedo components. Examples of denoised diffuse, specular, and emission components are shown as diffuse illumination 206, specular illumination 208, and emission 211. In an embodiment, the emission 211 represents directly visible light sources and is not filtered. In an embodiment, the diffuse and specular components are demodulated into material albedo k d and lighting albedo $k_s$, respectively. Examples of $k_d$ and $k_s$ are shown as $k_d$ 207 and $k_s$ 209. The material albedo represents high frequency material detail and the lighting albedo represents lower frequency lighting contributions. In an embodiment, the surface component also comprises surface normal vectors (nor shown) to preserve sharp edges in the denoised image 204.

During rendering, when a volume is a primary hit for a ray, a continuation ray is traced to hole-fill surface component buffers. The continuation ray provides component data for a pixel that is at least partially occluded by the volume. Examples of continuation ray contributions can be seen in the albedo components $k_d$ 207 and $k_s$ 209 and the emission 211.

As previously described, the noisy rendered image data 110 includes visual artifacts resulting from using a small number of samples. Furthermore, rendering using a reduced number of samples often results in the loss of high-frequency details and, when applied to sequences of images (e.g., video), temporal artifacts may be introduced. Temporal denoising techniques described in U.S. Pat. No. 11,475,542 titled "NEURAL NETWORK SYSTEM WITH TEMPORAL FEEDBACK FOR ADAPTIVE SAMPLING AND DENOISING OF RENDERED SEQUENCES" may be used to further improve the image reconstruction quality. Temporal guide data comprises motion data for both surfaces and volumes. In an embodiment, referring to FIG. 1C, the denoised image 145 output by the composite unit 140 for each rendered image frame in a sequence is reprojected (e.g., warped) to produce warped denoised surface data and warped denoised volume data. The reprojection is accomplished using per-pixel difference data (e.g., motion vectors) that indicate changes between the rendered image frame and a subsequent rendered image frame in a sequence.

Figure 2C:
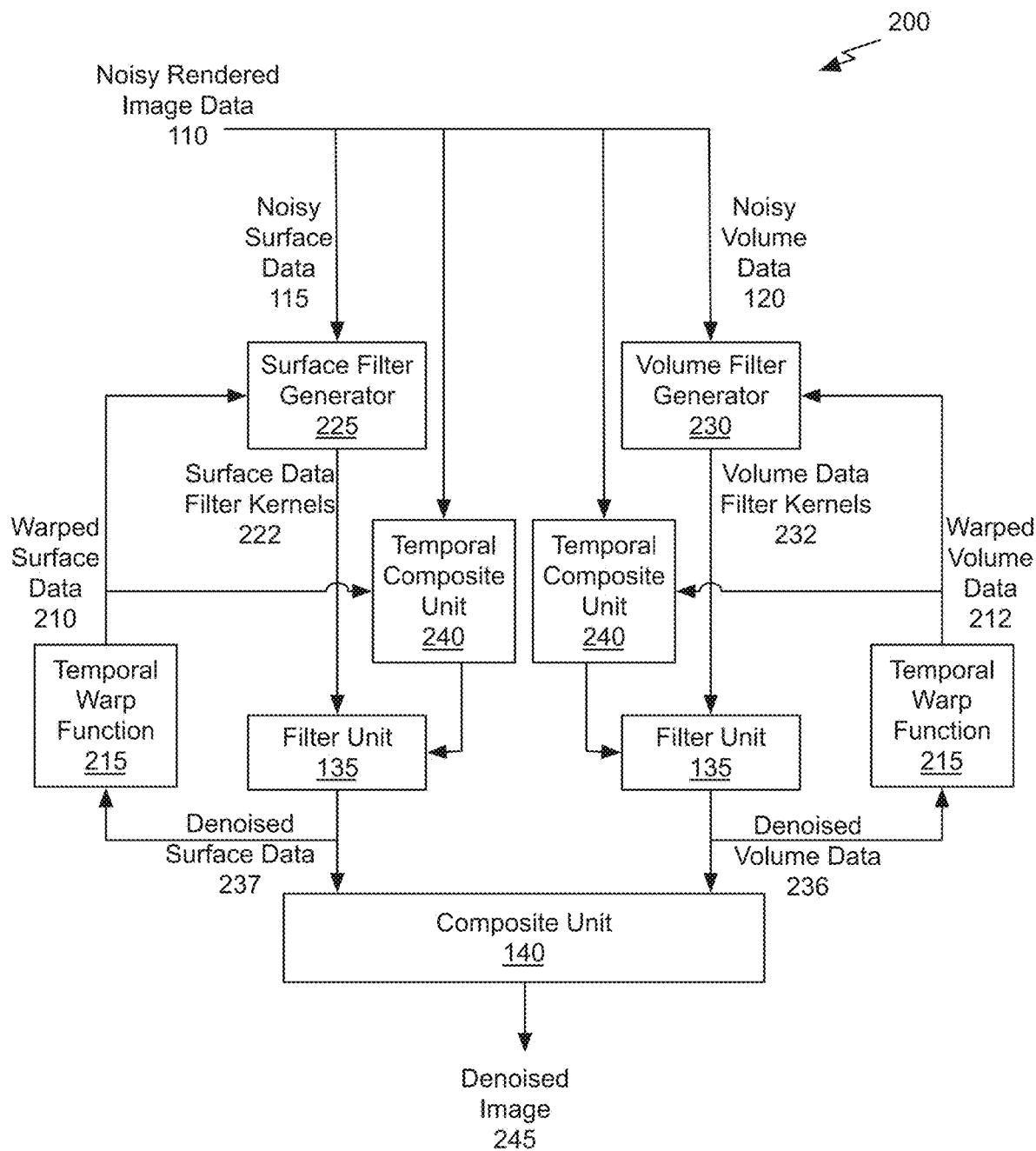
FIG. 2C illustrates a block diagram of another example joint neural denoising system suitable for use in implementing some embodiments of the present disclosure.

FIG. 2C illustrates a block diagram of another example joint neural denoising system 200 suitable for use in implementing some embodiments of the present disclosure. The joint neural denoising system 200 includes a surface filter generator 225, a volume filter generator 230, temporal composite units 240, filter units 135, temporal warp functions 215, and the composite unit 140. Compared with the joint neural denoising system 100, a temporal warping function 215 is inserted into a feedback path in the surface and volume processing paths in the denoising system. The temporal warping function 215 reprojects denoised surface data 237 and denoised volume data 236 (time=t−1) according to per-pixel difference data (e.g., motion vectors) to align with the next noisy rendered image data 110 (time=t). In an embodiment, the motion vectors address both camera movement and dynamic scene contents. In an embodiment, volume motion vectors are computed with respect to camera movement, based on the depth to the closest volume intersection for multiple samples per pixel. Due to the stochastic sampling of the volume, there is a chance for no eye ray to intersect with the volume even in regions with non-zero transmittance, which would result in a zero volume motion vector even though the camera has moved compared with the previous frame. To address this issue, during volume motion vector computation, a lookup for volume intersections is extended to a small local neighborhood in screen-space to more reliably find samples, and thus more meaningful motion data.

As shown in FIG. 2C, the denoised surface data 237 is transmitted by a recursive feedback loop and warped to produce warped surface data 210. Likewise, denoised volume data 236 is transmitted by a recursive feedback path and warped to produce warped volume data 212. In an embodiment, a learned "blending alpha" is used by a temporal composite unit 240 to blend the warped surface data 210 with the noisy surface data 115 and produce merged surface data. In an embodiment, a learned "blending alpha" is used by another temporal composite unit 240 to blend the warped volume data 212 with the noisy volume data 120 and produce merged volume data.

The temporal warp functions 215 provide the warped surface and volume data 210 and 212 that are used by the surface filter generator 225 and the volume filter generator 230, respectively. In an embodiment, the surface filter generator 225 receives the warped surface data 210 and noisy surface data 115 that includes the albedo for both diffuse and specular components. In an embodiment, the volume filter generator 230 receives the warped volume data 212 and the noisy volume data 120 that includes both the volume and transmittance components. In an embodiment, the first and second moments for each of the noisy rendered image data 110, the warped surface data 210, emission, and surface normal vectors are provided to the surface filter generator 225. In an embodiment, the first and second moments for each of the noisy rendered image data 110, the warped volume data 212, emission, and volume motion vectors are provided to the volume filter generator 230. The first and second moments for a component define a motion vector for the component.

Surface data filters 222 are applied to the merged surface data to produce denoised surface data 237. Volume data filters 232 are applied to the merged volume data to produce denoised volume data 236. The composite unit 140 combines the denoised surface data 237 and the denoised volume data 236 to produce a denoised image 245. In an embodiment, the temporal feedback paths improve both image quality and temporal stability. The temporal feedback path is particularly beneficial when the sample count is reduced and the amount of improvement is lessened as the number of samples increases.

Figure 3A:
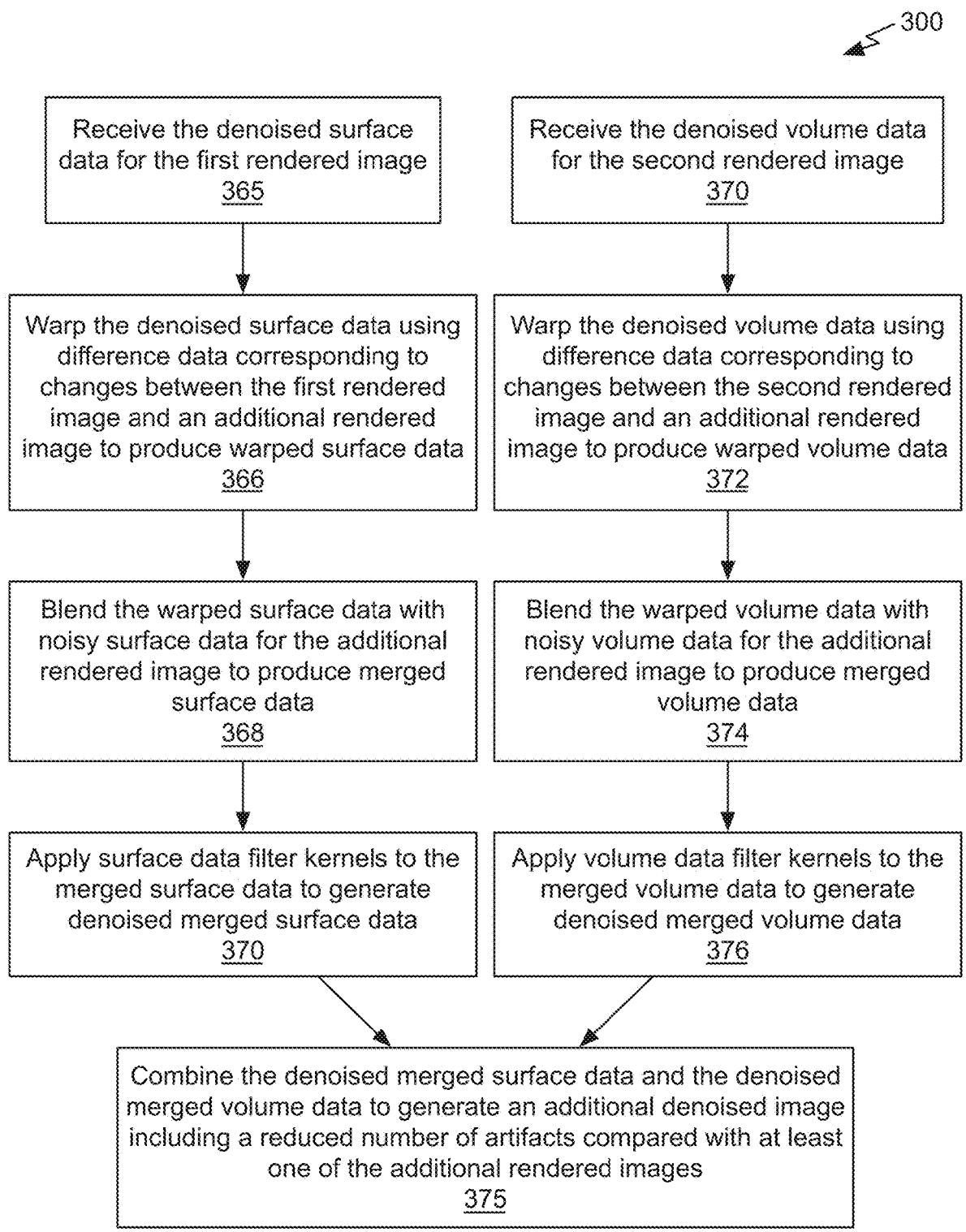
FIG. 3A illustrates another flowchart of a method for joint neural denoising of surfaces and volumes suitable for use in implementing some embodiments of the present disclosure.

FIG. 3A illustrates another flowchart of a method 300 for joint neural denoising of surfaces and volumes suitable for use in implementing some embodiments of the present disclosure. At step 365, the denoised surface data for the first rendered image is received. At step 370, the denoised volume data for the second rendered image is received. In an embodiment, the denoised surface data and the denoised volume data comprises the denoised surface data 237 and the denoised volume data 236, respectively. The denoised surface data and denoised volume data may be produced according to the method 150, where an additional rendered image is a subsequent frame in a video sequence compared with the first and second rendered images.

At step 366, the denoised surface data is warped using difference data corresponding to changes between the first rendered image and an additional rendered image to produce warped surface data. In an embodiment, the temporal warp function 215 computes the warped surface data based on motion data (e.g., motion vectors). At step 368, the warped surface data is blended with noisy surface data for the additional rendered image to produce merged surface data. At step 370, an additional surface filter is applied to the merged surface data to generate denoised merged surface data. In an embodiment, the additional surface filter comprises surface data filter kernels 222.

At step 372, the denoised volume data is warped using difference data corresponding to changes between the second rendered image and the additional rendered image to produce warped volume data. In an embodiment, the temporal warp function 215 computes the warped volume data based on motion data (e.g., motion vectors). At step 376, an additional volume filter is applied to the merged volume data to generated denoised merged volume data. At step 374, the warped volume data is blended with noisy volume data for the additional rendered image to produce merged volume data. In an embodiment, the additional volume filter comprises volume data filter kernels 232. In an embodiment, one or more of the steps 365, 366, 368, and 370 are performed in parallel with one or more of the steps 370, 372, 374, and 376.

At step 375, the denoised merged surface data and the denoised merged volume data are combined to generate an additional denoised image including a reduced number of artifacts compared with at least one of the additional rendered images. In an embodiment, the denoised merged surface data and the denoised merged volume data comprise the denoised surface data 237 and the denoised volume data 236, respectively. In an embodiment, merge parameters used to produce the merged volume data and the merged surface data are adjusted based on differences between the rendered image and a target image. In an embodiment, the merge parameters are learned weights that are adjusted during end-to-end training of the joint neural denoising system 100.

The joint neural denoising systems 100 and 200 support fully dynamic lighting and scenes, which enables interactive editing of scene parameters, such as volume density and albedo, or lighting conditions, such as environmental or volumetric lighting. Additionally, volumetric emission may also be edited to support effects, such as fire or explosions. In an embodiment, the noisy volumetric emission data is collected when a ray happens to pass through an emissive volume.

Figure 3B:
FIG. 3B illustrates an image and corresponding image with edited volume density in accordance with an embodiment.
Figure 3B:

FIG. 3B illustrates an image 305 and corresponding image with edited volume density 310 in accordance with an embodiment. A scene is rendered by path tracing 16 Monte Carlo samples per pixel to produce a noisy rendered image data that is denoised using two different volume densities. The volume density parameter is increased to denoise the rendered image with edited volume density 310 compared with the image 305.

Figure 3C:
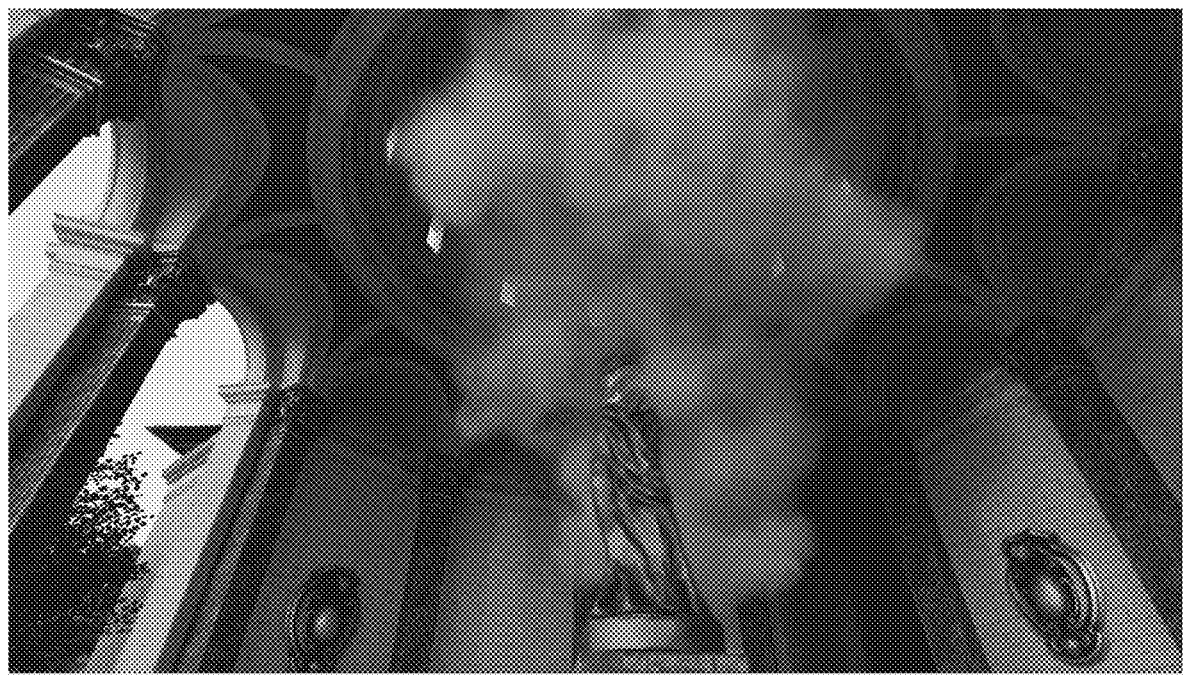
FIG. 3C illustrates an image and corresponding image with edited volumetric lighting in accordance with an embodiment.
Figure 3C:

FIG. 3C illustrates an image 315 and corresponding image with edited volumetric lighting 320 in accordance with an embodiment. The scene is rendered by path tracing 16 Monte Carlo samples per pixel to produce a noisy rendered image data that is denoised using two different volume lighting levels. The volume lighting parameter is increased to denoise the rendered image with edited volume density 320 compared with the image 315.

Denoising images rendered using Monte Carlo sampled ray tracing is an important technique for improving the image quality when low sample counts are used to render in real-time. Scenes that include semi-transparent volumes in addition to surface geometry may include more artifacts when low sample counts due to being more complex. Joint neural denoising of surfaces and volumes enables combined volume and surface denoising in real time from images rendered a low number of Monte Carlo samples. A rendered image is decomposed into volume and surface layers, leveraging spatio-temporal neural denoisers for both the surface and volume components. The individual denoised surface and volume components are composited using learned weights and denoised transmittance. A surface and volume denoiser architecture outperforms current denoisers in scenes containing both surfaces and volumes, while also producing temporally stable results at interactive rates. The joint neural denoising systems 100 and 200 can be trained end-to-end using the image-space losses to learn spatio-temporal filter kernels for surface data and volume data. Temporal interpolation values may also be learned during training.

Joint neural denoising may replace manually crafted algorithms used in performance-critical scenarios, e.g., real-time rendering and games. Joint neural denoising generally offers higher quality, and requires less tuning compared with the manually crafted algorithms. Joint neural denoising may also be applied to medical data, such as computed tomography scans or magnet resonance imaging. Because the nature of the medical datasets is mostly volumetric (soft tissue) combined with dense, surface-like materials (bones) joint neural denoising may produce significant improvements compared with conventional denoising.

Parallel Processing Architecture

Figure 4:
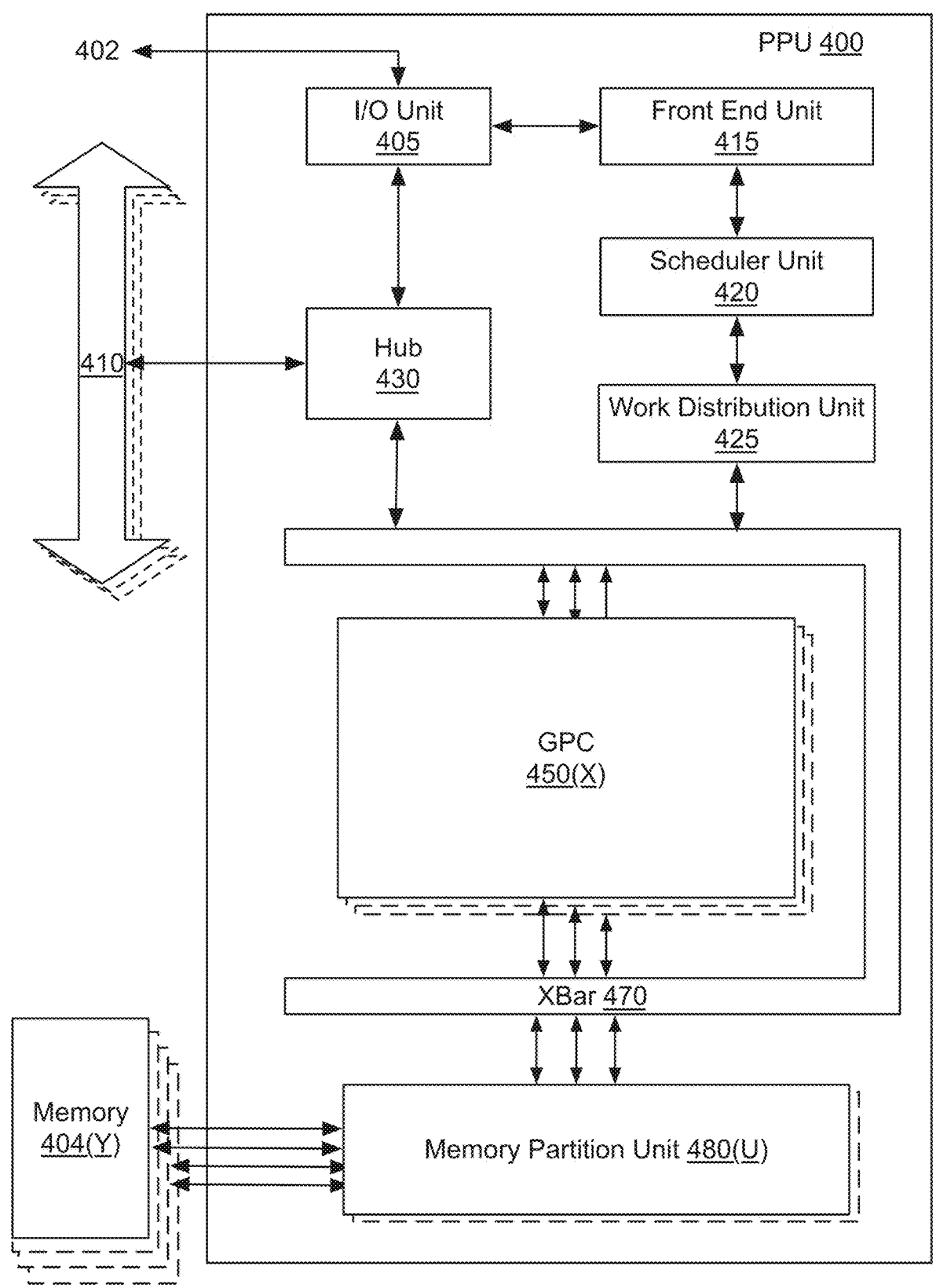
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the joint neural denoising systems 100 and/or 200. The PPU 400 may be used to implement one or more of the surface filter generator 125, volume filter generator 130, filter units 135, and composite unit 140, surface filter generator 225, volume filter generator 230, temporal composite units 240, and temporal warp functions 215 within the joint neural denoising systems 100 and 200. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
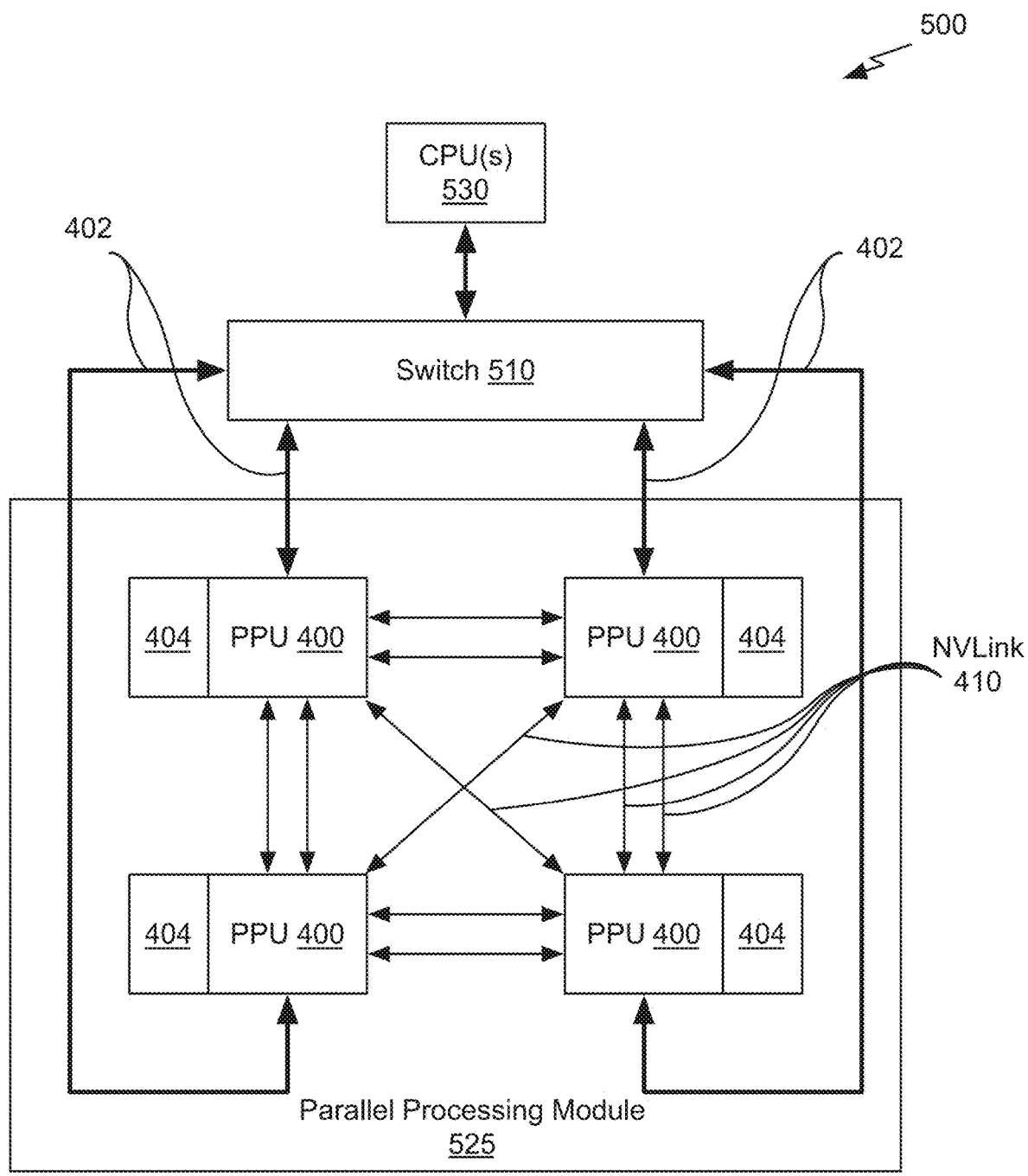
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 150 shown in FIG. 1D and/or the method 300 shown in FIG. 3A. The processing system 500 includes a CPU 530, switch 510, and multiple PPUs 400, and respective memories 404.

Figure 5B:
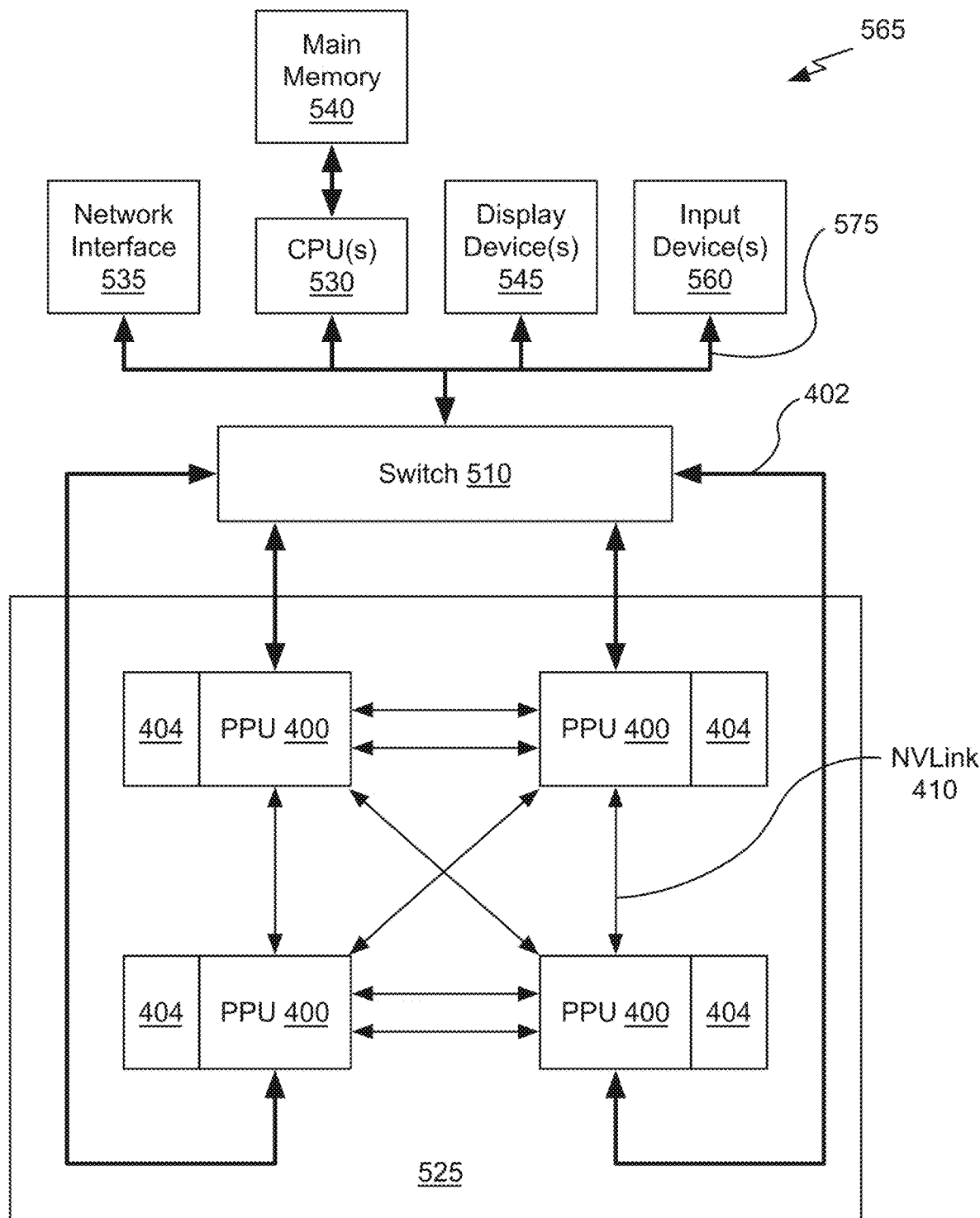
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 150 shown in FIG. 1D and/or the method 300 shown in FIG. 3A.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
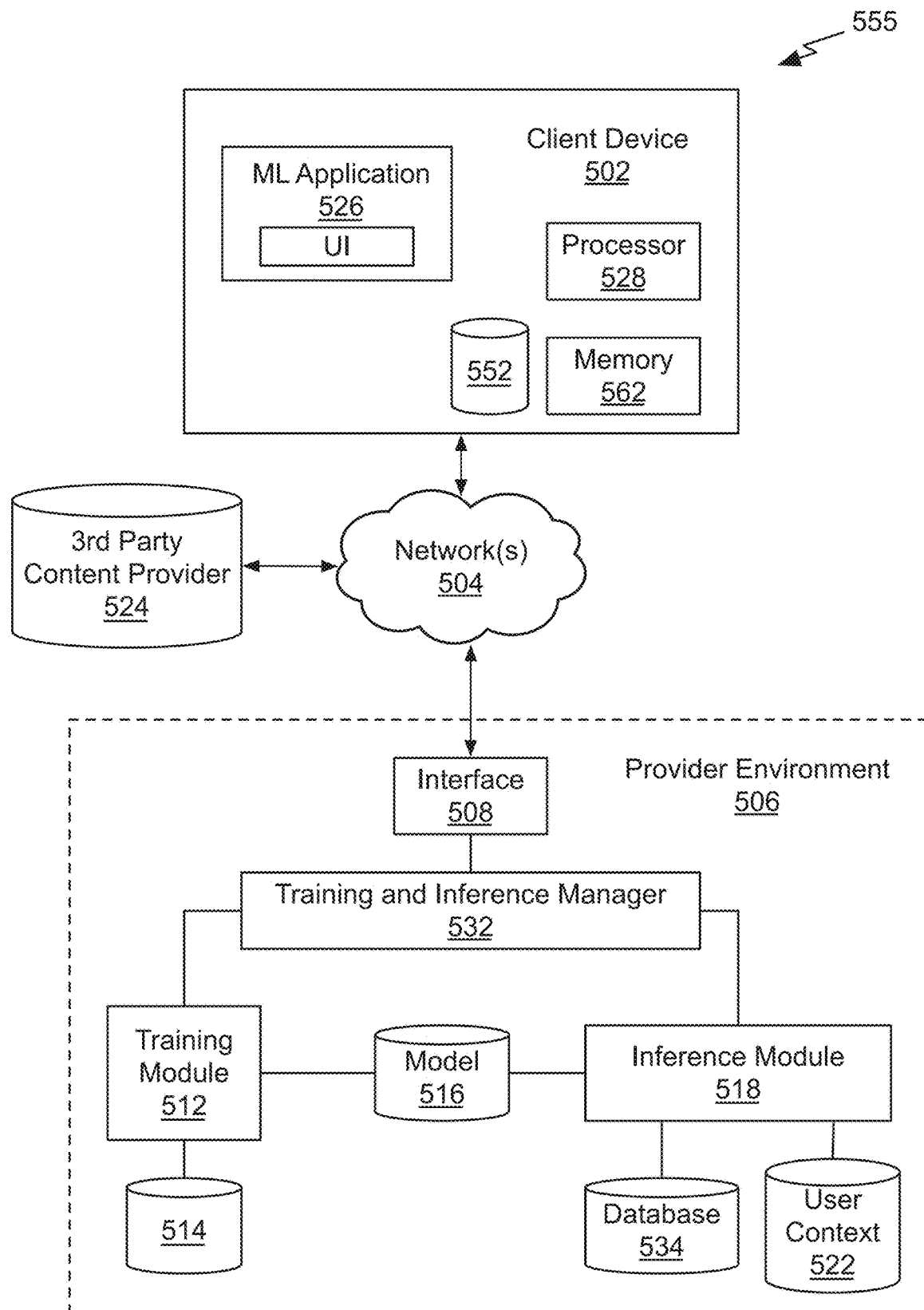
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
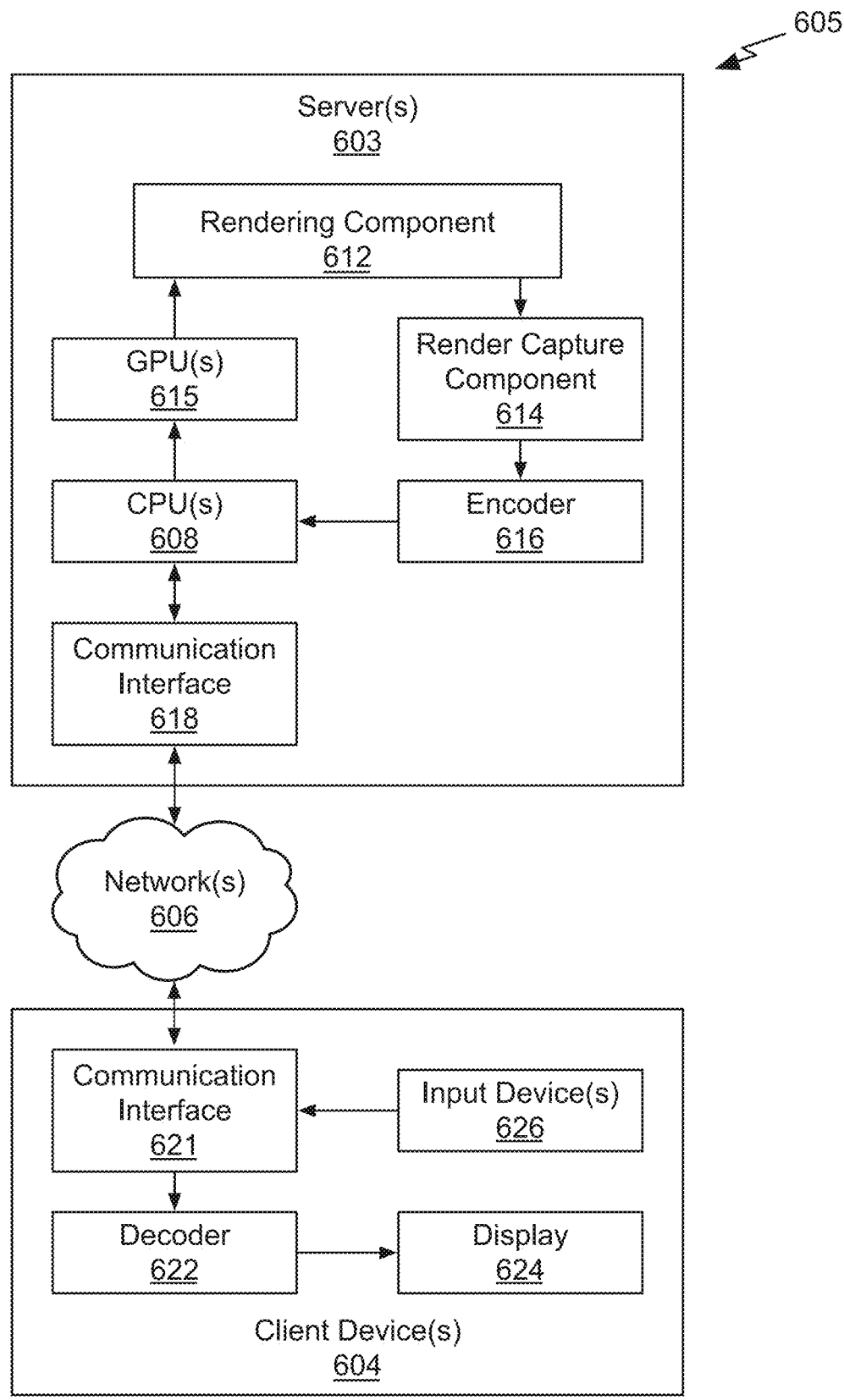
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
processing surface data associated with a first rendered image to produce a surface filter;
processing volume data associated with a second rendered image to produce a volume filter;
applying the surface filter to the surface data to generate denoised surface data;
applying the volume filter to the volume data to generate denoised volume data; and
combining the denoised surface data and the denoised volume data to generate a denoised image including a reduced number of artifacts compared with at least one of the first rendered image and the second rendered image.

2. The computer-implemented method of claim 1, wherein the denoised volume data comprises denoised transmittance data and denoised color data.

3. The computer-implemented method of claim 2, wherein combining comprises blending the denoised surface data and the denoised color data according to the denoised transmittance data.

4. The computer-implemented method of claim 1, wherein during rendering, the surface data is computed by extending a primary ray for each hit point that intersects a volume.

5. The computer-implemented method of claim 1, wherein the surface data and the volume data are processed using a single neural network model to produce the surface filter and the volume filter.

6. The computer-implemented method of claim 1, wherein the surface data is processed using a first neural network model to produce the surface filter and the volume data is processed using a second neural network model to produce the volume filter.

7. The computer-implemented method of claim 1, wherein the surface data for each rendered pixel comprises diffuse color, specular color, a normal vector, and a motion vector.

8. The computer-implemented method of claim 1, further comprising warping the denoised volume data using difference data corresponding to changes between the second rendered image and an additional rendered image to produce warped volume data.

9. The computer-implemented method of claim 8, further comprising blending the warped volume data with noisy volume data for the additional rendered image to produce merged volume data.

10. The computer-implemented method of claim 9, further comprising
applying an additional surface filter to merged surface data to generate denoised merged surface data;
applying an additional volume filter to the merged volume data to generate denoised merged volume data; and
combining the denoised merged surface data and the denoised merged volume data to generate an additional denoised image including a reduced number of artifacts compared with the additional rendered image.

11. The computer-implemented method of claim 9, further comprising adjusting parameters used to produce the merged volume data based on differences between a target image and at least one of the first rendered image and the second rendered image.

12. The computer-implemented method of claim 1, further comprising adjusting parameters used to process the surface data and the volume data based on differences between a target image and at least one of the first rendered image and the second rendered image.

13. The computer-implemented method of claim 12, further comprising adjusting additional parameters used to combine the denoised surface data and the denoised volume data based on the differences.

14. The computer-implemented method of claim 1, wherein at least one of the steps of applying the surface filter, applying the volume filter, and combining are performed on a server or in a data center to generate the denoised image, and the denoised image is streamed to a user device.

15. The computer-implemented method of claim 1, wherein at least one of the steps of applying the surface filter, applying the volume filter, and combining are performed within a cloud computing environment.

16. The computer-implemented method of claim 1, wherein at least one of the steps of applying the surface filter, applying the volume filter, and combining are performed for training, testing, or certifying a neural network employed in a machine, robot, or autonomous vehicle.

17. The computer-implemented method of claim 1, wherein at least one of the steps of applying the surface filter, applying the volume filter, and combining is performed on a virtual machine comprising a portion of a graphics processing unit.

18. A system, comprising:
a memory that stores surface data associated with a first rendered image and volume data associated with a second rendered image; and
a processor that is connected to the memory and is configured to:
process the surface data to produce a surface filter;
process the volume data to produce a volume filter;
apply the surface filter to the surface data to generate denoised surface data;
apply the volume filter to the volume data to generate denoised volume data; and
combine the denoised surface data and the denoised volume data to generate a denoised image including a reduced number of artifacts compared with at least one of the first rendered image and the second rendered image.

19. The system of claim 18, wherein the denoised volume data comprises denoised transmittance data and denoised color data.

20. A non-transitory computer-readable media storing computer instructions that, when executed by one or more processors, cause the one or more processors to perform the steps of:
processing surface data associated with a first rendered image to produce a surface filter;
processing volume data associated with a second rendered image to produce a volume filter;
applying the surface filter to the surface data to generate denoised surface data;
applying the volume filter to the volume data to generate denoised volume data; and
combining the denoised surface data and the denoised volume data to generate a denoised image including a reduced number of artifacts compared with at least one of the first rendered image and the second rendered image.

21. The non-transitory computer-readable media of claim 20, wherein the denoised volume data comprises denoised transmittance data and denoised color data.

22. A computer-implemented method for use with a set of rendered images, comprising:
- processing surface data associated with a first rendered image in the set to produce a surface filter;
- processing volume data associated with a second rendered image in the set to produce a volume filter;
- applying the surface filter to the surface data to generate denoised surface data;
- applying the volume filter to the volume data to generate denoised volume data; and
- combining the denoised surface data and the denoised volume data to generate a denoised image.

23. The computer-implemented method of claim 22, wherein the first rendered image and the second rendered image are associated with a same scene.

24. The computer-implemented method of claim 22, wherein the denoised image has fewer artifacts than at least one of the first and second rendered images.

25. The computer-implemented method of claim 22, wherein a property of the volume data comprises at least one of semi-transparency and emissive lighting.

26. The computer-implemented method of claim 22, wherein the first rendered image is produced using ray-tracing and the second rendered image is produced using ray-marching.

* * * * *